3,485,720
MALTING OF BARLEY OR OTHER CEREALS
Bernard Dixon, Harpenden, and Alan A. D. Comrie, Manchester, England, assignors to Enzymic Malt Company, Ltd., and Dixon Malt Company, Ltd., both of London, England, jointly
No Drawing. Filed Jan. 10, 1967, Ser. No. 608,259
The portion of the term of the patent subsequent to Sept. 13, 1983, has been disclaimed
Claims priority, application Great Britain, Jan. 11, 1967, 1,302/66
Int. Cl. C12c 1/04
U.S. Cl. 195—70      13 Claims

ABSTRACT OF THE DISCLOSURE

A method of malting cereals such as barley by steeping, draining away the steep water, and permitting the grain to form rootlets in a first aerobic atmosphere; subjecting it to an anaerobic atmosphere, e.g., by reducing or removing or displacing or expelling the oxygen until the rootlets have been killed as ascertained by reference to the condition of the rootlets in a visual and/or tactile examination; then subjecting the grain to a second aerobic atmosphere until modification of the grain reaches the desired degree.

---

This invention relates to improvements in the malting of barley or other cereals, and is a development of the invention described in U.S. No. 3,272,718.

That invention introduces a period during germination when the atmosphere surrounding the grain is changed for one containing no oxygen. Germination and modification according to our above-mentioned invention can be said to take place in three phases: (1) An initial germination phase in air immediately after steeping, (2) An anaerobic phase of 1–48 hours, and (3) a final modification phase in air. By "modification" is meant the changes in structure and composition of the grain that occur when it is converted into malt.

The object of the present invention is to bring about the charges in barley that convert it into malt with less than the usual loss of dry weight which accompanies such conversion when it is carried out by traditional methods.

Another object of the present invention is to provide a process wherein the time for the restoration of oxygen to the grain, so that the final modification phase can be carried out, may be ascertained with ease, accuracy and reproduceability by reference primarily to the physical rather than the biological condition of the rootlets, the physical condition being dependent on the biological condition and used as an indicator of the latter.

According to the present invention, a method of malting barley or other cereal comprises steeping the grain, draining away the steep water and permitting the grain, preferably while in the same vessel, to form rootlets in a first aerobic atmosphere; subjecting the grain to an anaerobic atmosphere until the rootlets have been killed, as indicated by their being changed from their normal condition to being flaccid and translucent; and then restoring the grain to a second aerobic atmosphere and maintaining it therein until modification of the grain has reached the desired degree.

The anaerobic atmosphere may be induced in several ways, for instance by reducing the amount of oxygen in contact with the grain while preventing the access of further oxygen, thereby allowing the residue of oxygen to be converted into carbon dioxide by the respiring grain; or by displacing the first aerobic atmosphere by an inert non-toxic gas, e.g. carbon dioxide or nitrogen, or by a mixture of inert non-toxic gases, for a period of 1 to 48 hours at a temperature of up to 40° C.; or the replacement of the first aerobic atmosphere by the anaerobic atmosphere may be assisted by displacing the first aerobic atmosphere by water, and then displacing the water by the anaerobic atmosphere.

Prevention of the access of the oxygen may be accomplished in various ways. For example, the anaerobic atmosphere may be induced by extracting the first aerobic atmospheric from the vessel holding the steeped grain and sealing said vessel, or by displacing air from the vessel holding the steeped grain by adding more germinating grain and then sealing said vessel, or by removing the oxygen physically or chemically from the first aerobic atmosphere. The oxygen may be removed by a reducing agent such as sodium dithionite or by an absorbent such as alkaline pyrogallol.

Alternatively, the oxygen may be reduced by steeping the grain and maintaining it in the first aerobic atmosphere in a flexible and potentially airtight container; and then collapsing said container to reduce its volume until it is substantially filled by the grain, and sealing said container.

A feature of the invention is that the whole of the process, and also the process of drying and curing the germinated grain, may if desired be carried out in the one containing vessel.

The invention will be described with reference to the following examples.

EXAMPLE 1

The grain is steeped in water in a potentially air-tight vessel, the water is drained away and the moist grain is allowed to germinate until the rootlets are 2–10 mm. long (first aerobic phase). The air in the vessel is then replaced by carbon dioxide and the vessel is sealed and held for 24 hours at a temperature of 15° C. (anaerobic phase at which time the rootlets are killed as is shown by their becoming flaccid and translucent). Finally the vessel is re-opened, the carbon dioxide is replaced by air, and the grain is held in air until modification has proceeded to the desired extent (second aerobic phase).

EXAMPLE 2

The grain is steeped in water containing a suitable agent, i.e., 0.05% of formaldehyde and thenceforward treated as in Example 1.

EXAMPLE 3

The grain is steeped in water containing a suitable agent, i.e., 0.1% of lactic acid, and thenceforward treated as in Example 1.

EXAMPLES 4 to 8

The general procedure of Example 1 is followed, but with variations which, for convenience, are set out in summary form in the table below.

| | Anaerobic phase | | |
|---|---|---|---|
| Example No. | Temperature, °C. | Duration, hrs. | Inert gas |
| 4 | 20 | 16 | Carbon dioxide. |
| 5 | 25 | 10 | Do. |
| 6 | 30 | 6 | Do. |
| 7 | 35 | 4 | Do. |
| 8 | 25 | 10 | Nitrogen. |

EXAMPLE 9

The grain is steeped in water and held in air as in Example 1. The air in the vessel is then replaced by water at 40° C. and the water is replaced by carbon dioxide, also at 40° C. (anaerobic phase). The grain is held in this atmosphere at 40° C. for 1½ hours at which time the rootlets have become flaccid and translucent, after which the carbon dioxide is replaced by air at 15° C. and the grain is held in air until it has modified to the desired extent.

EXAMPLE 10

The grain is steeped in water in a potentially airtight vessel, the water is drained away and the moist grain is allowed to germinate until the rootlets have emerged (first aerobic phase). The vessel is then sealed and the internal pressure reduced by a vacuum pump, to about 250 mm. or less, after which the grain is held at a temperature of 25° C. for 8 hours (anaerobic phase at which time the rootlets are killed as is shown by their becoming flaccid and translucent). Finally air is re-admitted, the vessel is re-opened, and the grain is held in air until modification has proceeded to the desired extent (second aerobic phase).

EXAMPLE 11

The grain is steeped in water and held in air as in Example 10. The free space above the grain is then filled with grain in a similar state of germination from another vessel, the vessel is sealed, and the grain is held at a temperature of 30° C. for 6 hours, at which time the rootlets have become flaccid and translucent. Final modification is carried out as in Example 10.

EXAMPLE 12

The grain is treated as in Example 10 except that when the rootlets are approximately 3-5 mm. long the vessel is sealed and the air it contains is circulated via an apparatus in which the oxygen is removed from the air by contact with a reducing agent such as sodium dithionite before it returns to the vessel.

EXAMPLE 13

The grain is treated as in Example 10 except that an oxygen absorbent such as alkaline pyrogallol is placed in the vessel, which is then sealed and held at a temperature of 20° C. for 10 hours.

EXAMPLE 14

The grain is steeped in water in a flexible and potentially airtight container, the water is drained away and the moist grain is allowed to germinate to a stage where the rootlets are between 2 mm. and a maximum of 10 mm. The flexible container is then collapsed so as to be reduced in volume until it is filled by the grain, sealed, and held at a temperature of 25° C. for 8 hours at which time the rootlets have become flaccid and translucent. Finally air is re-admitted and the grain is held in air until modification has proceeded to the desired extent.

The above examples may be varied in one or more of the following ways:

(1) Steep may be warm, is desired,
(2) Steep may be aerated, if desired,
(3) A suitable agent such as hydrogen peroxide, formaldehyde, or lactic acid may be added to the steep, to stimulate germination,
(4) The acidity of the germinating grain may be adjusted by the addition of lactic acid in manner known per se.

The duration of the anaerobic phase may be adjusted according to the type of barley being handled.

What is claimed is:

1. A method of malting barley or other cereal which comprises steeping the grain, draining away the steep water and permitting the grain, to form rootlets in a first aerobic atmosphere; subjecting the grain to an anaerobic atmosphere until the rootlets have been killed, as indicated by their being changed from their normal condition to being flaccid and translucent; and then restoring the grain to a second aerobic atmosphere and maintaining it therein until modification of the grain has reached the desired degree.

2. A method as claimed in claim 1, wherein the anaerobic atmosphere is induced by reducing the amount of oxygen in contact with the grain while preventing the access of further oxygen, thereby allowing the residue of oxygen to be converted into carbon dioxide by the respiring grain.

3. A method as claimed in claim 1, wherein the anaerobic atmosphere is induced by displacing the first aerobic atmosphere by an inert non-toxic gas, e.g., carbon dioxide or nitrogen, or by a mixture of inert non-toxic gases, for a period of 1 to 48 hours at a temperature of up to 40° C.

4. A method as claimed in claim 3, wherein the replacement of the first aerogic atmosphere by the anaerobic atmosphere is assisted by displacing the first aerobic atmosphere by water, and then displacing the water by the anaerogic atmosphere.

5. A method as claimed in claim 1, wherein the anaerobic atmosphere is induced by extracting the first aerobic atmosphere from the vessel holding the steeped grain and sealing said vessel.

6. A method as claimed in claim 1, wherein the anaerobic atmosphere is induced by displacing air from the vessel holding the steeped grain by adding more germinating grain and then sealing said vessel.

7. A method as claimed in claim 1, wherein the anaerobic atmosphere is induced by removing the oxygen physically or chemically from the first aerobic atmosphere.

8. A method as claimed in claim 7, wherein the oxygen is removed by a reducing agent such as sodium dithionite.

9. A method as claimed in claim 7, wherein the oxygen is removed by an absorbent such as alkaline pyrogallol.

10. A method as claimed in claim 2, wherein the oxygen is reduced by steeping the grain and maintaining it in the first aerogic atmosphere in a flexible and potentially airtight container; and then collapsing said container to reduce its volume until it is substantially filled by the grain, and sealing said container.

11. In a method of malting barley or other cereal which comprises subjecting the grain to an anaerobic atmosphere and then restoring an oxygen atmosphere to the grain for further modification, the improvement comprising restoring the oxygen atmosphere to the grain when the rootlets have changed from their normal condition to being flaccid and translucent.

12. Method defined in claim 11 wherein the anaerobic atmosphere is induced by collapsing a variable volume malting vessel onto the mass of grain until it is substantially filled by the grain, and sealing the vessel.

13. Method defined in claim 11 wherein the anaerobic atmosphere is induced by sealing the malting vessel, substantially eliminating oxygen from the vessel and permitting the rootlets to metabolize any remaining oxygen from the vessel atmosphere.

References Cited

UNITED STATES PATENTS 3,141,833    7/1964    Dixon _____ 195—71
3,272,718    9/1966    Comrie et al. _____ 195—71

OTHER REFERENCES

Stone, Wallerstein Lab. Comm., vol. 24, No. 84, pp. 252–260; Wallenstein Advances in Beer Quality, Part 1, Stecher, Merch Index, 7th ed. p. 880, 1960.

LIONEL M. SHAPIRO, Primary Examiner
NORMAN ROSKIN, Assistant Examiner